United States Patent [19]

Minjolle et al.

[11] 4,424,179

[45] Jan. 3, 1984

[54] METHOD OF MANUFACTURING A SINTERED SILICON CARBIDE CERAMIC PART

[75] Inventors: Louis Minjolle, Tarbes; Bernard Lengronne, Monsegur; Joseph Calvet, Tarbes; Serge Chateigner, Rabastens de Bigorre, all of France

[73] Assignee: Societe Anonyme dite: Ceraver, Paris, France

[21] Appl. No.: 376,630

[22] Filed: May 10, 1982

[30] Foreign Application Priority Data

May 18, 1981 [FR] France ................................ 81 09822

[51] Int. Cl.$^3$ .............................................. C04B 35/64
[52] U.S. Cl. ......................................... 264/44; 264/63
[58] Field of Search ................................... 264/44, 63

[56] References Cited

U.S. PATENT DOCUMENTS

| | | | |
|---|---|---|---|
| 3,985,846 | 10/1976 | Lundsager et al. | 264/44 |
| 4,124,667 | 11/1978 | Coppola et al. | 264/63 |
| 4,233,256 | 11/1980 | Ohnsorg | 264/63 |

FOREIGN PATENT DOCUMENTS

| | | | |
|---|---|---|---|
| 55-114523 | 9/1980 | Japan | 264/63 |
| 706728 | 4/1954 | United Kingdom. | |
| 2028374 | 3/1980 | United Kingdom. | |

OTHER PUBLICATIONS

Foster et al., Sintering Carbides by Means of Fugitive Binders, in Journal of the Ceramic Society, vol. 33, No. 1, pp. 27-33, Jan. 1950.

*Primary Examiner*—James H. Derrington
*Attorney, Agent, or Firm*—Kenyon & Kenyon

[57] ABSTRACT

A method of manufacturing a sintered silicon carbide ceramic part in which is formed a mixture of carbide powder with a sintering additive based on boron, beryllium or aluminium, and an injection moulding additive comprising a mixture of polystyrene and a wax. A moulded part is manufactured by injection moulding and is then baked and is finally sintered.

Polystyrene is used simultaneously as a moulding agent and as a carbonizable substance. When the moulded part is baked it is heated in air to a temperature between 230° C. and 330° C. and is then kept at that temperature for a fairly long time to remove the wax and to reticulate and oxidize the polystyrene.

Application to manufacturing dense sintered parts.

9 Claims, No Drawings

METHOD OF MANUFACTURING A SINTERED SILICON CARBIDE CERAMIC PART

The present invention relates to a method of manufacturing a sintered silicon carbide part comprising the following steps:

(a) forming a mixture of a silicon carbide powder, at least one sintering additive, and an injection moulding agent; said sintering additive being chosen from the group consisting of boron, boron compounds, beryllium, beryllium compounds, aluminium and aluminium compounds; and said injection moulding agent comprising a mixture of polystyrene and a wax having a lower volatilisation temperature than the volatilisation temperature of the polystyrene, said polystyrene being carbonized during sintering to produce 0.5% to 5% by weight carbon relative to the weight of the silicon carbide;

(b) shaping a moulded part by injection;

(c) baking the moulded part; and (d) sintering the baked moulded part at a temperature of 1900° C. to 2200° C. under an inert atmosphere or under a vacuum.

BACKGROUND OF THE INVENTION

Document No. FR-A-2 432 491 proposes a method of this kind in which the moulded part is baked at a temperature which lies between 500° C. and 1000° C. in conditions such that the excess carbide required to facilitate sintering is provided by carbonizing polystyrene; this entails baking in a non-oxidizing atmosphere. Also 0.1% to 3% by weight, relative to the total weight of the mixture of an organo-titanate such as tetra(2-ethylphenyl)titanate is added to the initial mixture so as to reduce its viscosity.

Due to the high baking temperature, such a method needs a very gradual rise in temperature at a rate of 1° C. to 10° C. per hour up to the final temperature and consequently a long period at the baking temperature to prevent deformation of the parts. Also, the organo-titanates are expensive products and leave a titanium residue in the final product.

The present invention aims to provide a manufacturing method in which the rate of temperature rise for baking can be higher and consequently requires baking to last for a shorter time, said method not requiring expensive addition of a viscosity reducer agent.

SUMMARY OF THE INVENTION

In the method of the invention, the baking of the moulded part includes heating the moulded part under an oxidising atmosphere to a temperature of 230° C. to 330° C. and then maintaining the part at said temperature for long enough to eliminate the wax and to reticulate and to oxidize at least a portion of the polystyrene.

Further, the method preferably includes at least one of the following steps:

the temperature and the duration of heating between 230° C. and 330° C. are adjusted so as to decompose 20% to 60% of the initial polystyrene;

the proportion by weight of polystyrene is 5% to 18% relative to the weight of silicon carbide;

the proportion of wax is 1% to 8% by weight relative to the weight of silicon carbide;

the wax is an ester wax whose volatilization temperature lies between 110° C. and 300° C.;

a plasticizer which can be removed during baking of the moulded part is added to the polystyrene and wax mixture;

the proportion of plasticizer is 2% to 6% by weight related to the weight of silicon carbide;

the plasticizer is dioctyl phthalate or dibutyl phthalate;

the mixture includes about 85% by weight silicon carbide and sintering additive, 9% polystyrene, 2.4% wax and 3.6% plasticizer, and at the end of the heating in an oxidizing atmosphere, the loss of weight is about 8% to 9%;

after heating in a oxidizing atmosphere, the part undergoes heat treatment in an inert gas by heating up to a final temperature of about 900° C., the temperature rising at a rate such that the loss of weight of the part is stabilized when it reaches the final temperature;

the temperature rises at a rate of 50° C. per hour and 100° C. per hour.

DETAILED DESCRIPTION

A method of manufacturing sintered silicon carbide parts in accordance with the invention is described hereinafter by way of example.

Firstly, silicon carbide powder of the alpha crystalline variety and having a specific surface area of 7 m$^2$/g is obtained by the Acheson method. The powder is disposed in a silicon carbide crucible which is inserted in a graphite resistance oven which is connected to a vacuum pump for purification treatment. A vacuum of about 1 millibar is set up in the oven and the temperature therein is raised to between 1200° C. and 1600° C. It is possible to operate in a higher vacuum e.g. of about 10$^{-3}$ millibars, using a secondary vacuum pump. In this case, the pressure in the oven temporarily rises due to the gases evolved by the powder.

The temperature is maintained for a period of from 5 minutes to 12 hours—a period of which depends on the quantity of impurities and which varies inversely with maximum temperature. For a relatively pure powder, heat treatment at 1600° C. for 5 minutes may be sufficient.

After the heat treatment, the specific surface area of the powder is only about 2 m$^2$/g and its quantity of oxygen is about 500 parts per million (ppm). 1% by weight of powdered crystallized boron is added thereto, and the mixture is dispersed in a volatile organic liquid such as petroleum spirit or cyclohexane.

Another sintering additive can be substituted for boron, e.g. 1% to 5% by weight of silicon-aluminium nitride with 6% to 90% aluminium relative to silicon plus 0.025% to 0.1% by weight of crystallized boron, in accordance with the method described in the assignee's French patent application No. 8 103 589 of Feb. 24, 1981.

The suspension is crushed in a steel ball mill. For example, for a suspension of 30 g of one of the preceding mixtures of 140 cm$^3$ of cyclohexane, the ball mill contains 1.6 kg of 3 mm diameter balls rotating at a speed of 300 r.p.m. The suspension is crushed for 3 hours.

To remove iron which comes from the balls and from the walls of the ball mill, the powder is dried then dispersed in a diluted hydrochloric acid solution until the iron ions disappear. The powder is washed in acidulated distilled water then the suspension is decanted and dried in an oven.

85 parts by weight of the powder obtained hereinabove, 9 parts by weight of lubricated polystyrene commercialized by ATO-Chimie under the trademark 1531, 2.4 parts of ester wax commercialized by BASF and 3.6 parts of dioctylphthalate sold by PCUK under the trademark DOP K8 are then inserted in a mixing machine.

Mixing is performed for 2 hours. The substance obtained is allowed to cool, then it is granulated and sifted.

The substance is moulded in apparatus equipped with a piston.

The substance is then kept at a temperature of 150° C. and at a pressure of 175 bars. It can also be shaped by hot thermoplastic extrusion.

The parts obtained are then baked in air, the rate of temperature rise and the baking temperature level depending on the thickness thereof. For example, parts 1.3 mm thick are brought from 20° C. to 230° C. in 2 hours and are kept at 230° C. for 28 hours. Thicker parts are heated more slowly and the final temperature is higher. After cooling, the loss in weight of the parts is measured and should be 8% to 9% so that the parts contain 6% to 7% of a product derived from polystyrene which can already be at least partially in the form of carbon. The quantity of decomposed polystyrene is about one third of the initial quantity.

It is also possible to operate with mixtures with higher or lower silicon carbide contents, in particular 80% to 90% by weight of silicon carbide and with 10% to 20% of an additive mixture containing polystyrene, wax and plasticizer, there being about 60% polystyrene. For a content of 80% silicon carbide, baking can be considered as ended when about one fourth of the initial polystyrene has gone.

After baking in air, the parts undergo heat treatment in a vacuum or in an inert gas atmosphere (e.g. argon or nitrogen) with the parts being heated to about 900° C. at a rate such that the loss in weight of the parts due in particular to ethylene being evolved is stabilized at said temperature. This temperature rise rate may lie in the range 50° C. to 100° C. per hour.

The parts obtained are then directly sintered e.g. at 2100° C. for 30 minutes in an argon atmosphere.

The density of the sintered parts lies between 3.05 and 3.20 Kg/dm$^3$, i.e. greater than or equal to 95% of their theoretical density.

If the same moulded parts are baked using the same temperature curve but without the oxidizing treatment followed by the same heat treatment in a vacuum or in an inert gas atmosphere at 900° C. and the same sintering operation at 2100° C., only porous parts are obtained with an open porosity of 20% to 25% with a density of 2.46 to 2.50 Kg/dm$^3$. It seems that this porosity can be ascribed to a lack of free carbon due to the polystyrene depolymerizing without carbonizing.

By way of comparison, the following table gives the losses of weight and the final densities and porosities after sintering of: (1) parts subjected to heating to 230° C., to heat treatment at 900° C. in a vacuum and to sintering at 2100° C. as described hereinabove; (2) parts which undergo heating in an argon atmosphere and heat treatment in a vacuum and are then sintered; and (3) sintered parts in the raw state or after only heat treatment in a vacuum.

In said table, the expressions $\Delta P_{PD}$, $\Delta P_D$, $\Delta P_{TD}$, $\Delta P_F$, $\Delta P_T$, D and P mean, respectively:

loss of weight (in percentage) after heating in air at 230° C.;
loss of weight resulting from the heat treatment at 900° C. in a vacuum;
total loss of weight after heat treatment in a vacuum;
loss of weight on sintering;
total loss of weight after sintering;
density (in Kg/dm$^3$); and
porosity (in percentage).

The index D for a sample indicates that said sample has undergone heat treatment at 900° C. in a vacuum.

| | Sample N° | $\Delta P_{PD}$ | $\Delta P_D$ | $\Delta P_{TD}$ | $\Delta P_F$ | $\Delta P_T$ | D | P |
|---|---|---|---|---|---|---|---|---|
| Heating in air | 2 | 5.6 | | 5.6 | 10.6 | 16.2 | 2.91 | 4 |
| | 2D | 5.6 | 8.6 | 11.2 | 2.4 | 16.6 | 2.96 | 2.5 |
| | 3 | 9.8 | | 9.8 | 5 | 14.8 | 3.15 | 0 |
| | 3D | 9.8 | 2.2 | 12.0 | 2.9 | 14.9 | 3.13 | 0 |
| Heating in an argon atmosphere | 6 | 5.65 | | 5.65 | 11.2 | 16.8 | 2.47 | 23 |
| | 6D | 5.65 | 9.4 | 15.05 | 2.1 | 17.1 | 2.43 | 24 |
| | 7 | 9.54 | | 9.54 | 6.5 | 16.0 | 2.50 | 22.2 |
| | 7D | 9.54 | 5.1 | 14.6 | 2.0 | 16.6 | 2.50 | 21.5 |
| No heating to 230° C. | 10 | 0 | | 0 | 16.3 | 16.3 | 2.51 | 22 |
| | 10D | 0 | 14.4 | 14.4 | 2.3 | 16.7 | 2.54 | 20.2 |

Although the method described above appears to be the preferred embodiment of the invention, it will be understood that some changes can be made thereto without thereby going beyond the scope of the invention. In particular, a wax other than microcrystalline ester wax, e.g. a hydrocarbon wax, and plasticizer other than dioctylphthalate, e.g. dibutylphthalate could be added to the polystyrene. An oil with a lower volatilization temperature could be added to the wax. The substance could be injected in a screw-type apparatus.

We claim:

1. A method of manufacturing a sintered silicon carbide part, the method comprising the following steps:
   (a) mixing a silicon carbide powder, at least one sintering additive, and an injection moulding agent; said sintering additive being chosen from the group consisting of boron, boron compounds, beryllium, beryllium compounds, aluminium and aluminium compounds; and said injection moulding agent comprising a mixture of polystyrene and a wax having a lower volatilisation temperature than the volatilisation temperature of the polystyrene, said polystyrene being provided in a quantity sufficient to be carbonized during sintering to produce 0.5% to 5% by weight of carbon relative to the weight of the silicon carbide;
   (b) forming a shaped part by injection moulding said mixture;
   (c) baking the moulded part in an oxidizing atmosphere to a temperature of 230° C. to 330° C. and then maintaining the part at said temperature for long enough to eliminate the wax and to reticulate and to oxidize at least a portion of the polystyrene;
   (d) heat treating the baked part in an inert atmosphere or in a vacuum by heating up to a final temperature of about 900° C., the temperature rising at a rate of between 50° C. per hour and 100° C. per hour such that the loss of weight of the part is stabilized when it reaches the final temperature; and
   (e) sintering the heat treated moulded part at a temperature of 1900° C. to 2200° C. in an inert atmosphere or under a vacuum.

2. A method according to claim 1, wherein the temperature and the duration of heating between 230° C. and 330° C. are adjusted so as to decompose 20% to 60% of the initial polystyrene.

3. A method according to claim 1 or claim 2, wherein the proportion by weight of polystyrene is 5% to 18% by weight relative to the weight of silicon carbide.

4. A method according to claim 1, wherein the proportion of wax is 1% to 8% by weight relative to the weight of silicon carbide.

5. A method according to claim 1, wherein the wax is an ester wax whose volatilization temperature lies between 100° C. and 300° C.

6. A method according to claim 1, wherein a plasticizer which can be removed during baking of the moulded part is added to the polystyrene and wax mixture.

7. A method according to claim 6, wherein the proportion of plasticizer is 2% to 6% by weight related to the weight of silicon carbide.

8. A method according to claim 6, wherein the plasticizer is dioctyl phthalate or dibutyl phthalate.

9. A method according to claim 8, wherein the mixture includes about 85% silicon carbide and sintering additive, 9% polystyrene, 2.4% wax and 3.6% plasticizer, and wherein at the end of the heating in an oxidizing atmosphere, the loss of weight is about 8% to 9%.

* * * * *